US008903351B2

(12) United States Patent
Berry et al.

(10) Patent No.: US 8,903,351 B2
(45) Date of Patent: Dec. 2, 2014

(54) METHOD AND SYSTEM FOR EMERGENCY CALL HANDLING

(75) Inventors: Joseph J. Berry, Northville, MI (US); Mark J. Scalf, Warren, MI (US); Douglas R. VanDagens, Beverly Hills, MI (US); Francis Luk, Ann Arbor, MI (US); Timothy Robert Nixon, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 522 days.

(21) Appl. No.: 12/399,513

(22) Filed: Mar. 6, 2009

(65) Prior Publication Data

US 2010/0227582 A1   Sep. 9, 2010

(51) Int. Cl.
*H04M 11/04* (2006.01)
*H04M 1/60* (2006.01)
*H04M 1/725* (2006.01)
*H04W 76/00* (2009.01)
*H04W 4/22* (2009.01)
*H04W 84/18* (2009.01)

(52) U.S. Cl.
CPC .......... *H04M 1/6091* (2013.01); *H04W 76/007* (2013.01); *H04W 4/22* (2013.01); *H04M 11/04* (2013.01); *H04W 84/18* (2013.01); *H04M 1/72536* (2013.01)
USPC .................. 455/404.1; 455/404.2; 455/456.4

(58) Field of Classification Search
CPC  H04M 11/04; H04M 1/6091; H04M 1/72536
USPC ................................ 455/456.4, 404.2, 404.1
See application file for complete search history.

(56) References Cited

U.S. PATENT DOCUMENTS

| 4,442,485 A | 4/1984 | Ota et al. |
| 4,833,477 A | 5/1989 | Tendler |
| 4,937,796 A | 6/1990 | Tendler |

(Continued)

FOREIGN PATENT DOCUMENTS

| DE | 102008060567 | 2/2010 |
| EP | 1507129 A1 | 2/2005 |

(Continued)

OTHER PUBLICATIONS

Ford Motor Company, "Navigation System: SYNC," Owner's Guide Supplement, SYNC Version 1 (Jul. 2007).

(Continued)

*Primary Examiner* — Qun Shen
(74) *Attorney, Agent, or Firm* — Jennifer M. Stec; Brooks Kushman P.C.

(57) ABSTRACT

A vehicle communication system includes a computer processor in communication with persistent and non-persistent memory. The system also includes a local wireless transceiver in communication with the computer processor and configured to communicate wirelessly with a cellular telephone located at the vehicle. The system further includes a backup power circuit comprising a charge storage device such as a local battery or capacitor having enough charge to power the computer processor and local wireless transceiver long enough to send an emergency call signal to the cellular telephone, and an emergency call command signal is sent from the local wireless transceiver to the cellular telephone in the event a vehicle emergency is detected at the computer processor and vehicle power is lost. The signal causes the cellular telephone to place or continue an emergency call to an emergency responder or agency over the cellular telephone network.

3 Claims, 9 Drawing Sheets

(56) References Cited

U.S. PATENT DOCUMENTS

| | | | |
|---|---|---|---|
| 5,144,323 A | 9/1992 | Yonkers | |
| 5,223,844 A | 6/1993 | Mansell et al. | |
| 5,388,147 A | 2/1995 | Grimes | |
| 5,515,043 A | 5/1996 | Bernard et al. | |
| 5,555,286 A | 9/1996 | Tendler | |
| 5,598,460 A | 1/1997 | Tendler | |
| 5,649,059 A | 7/1997 | Tendler et al. | |
| 5,732,125 A * | 3/1998 | Oyama | 455/404.1 |
| 5,736,962 A | 4/1998 | Tendler | |
| 5,825,098 A | 10/1998 | Darby et al. | |
| 5,918,180 A | 6/1999 | Dimino | |
| 6,014,555 A | 1/2000 | Tendler | |
| 6,073,004 A | 6/2000 | Balachandran | |
| 6,151,385 A | 11/2000 | Reich et al. | |
| 6,266,617 B1 | 7/2001 | Evans | |
| 6,275,713 B1 | 8/2001 | Toda | |
| 6,292,551 B1 | 9/2001 | Entman et al. | |
| 6,427,072 B1 * | 7/2002 | Reichelt | 455/404.1 |
| 6,496,107 B1 | 12/2002 | Himmelstein | |
| 6,504,909 B1 | 1/2003 | Cook et al. | |
| 6,516,198 B1 | 2/2003 | Tendler | |
| 6,519,463 B2 | 2/2003 | Tendler | |
| 6,532,372 B1 | 3/2003 | Hwang | |
| 6,608,887 B1 | 8/2003 | Reksten et al. | |
| 6,633,754 B1 * | 10/2003 | Raith | 455/404.1 |
| 6,647,270 B1 | 11/2003 | Himmelstein | |
| 6,680,998 B1 | 1/2004 | Bell et al. | |
| 6,757,528 B1 | 6/2004 | Cardina et al. | |
| 6,775,356 B2 | 8/2004 | Salvucci et al. | |
| 6,778,820 B2 | 8/2004 | Tendler | |
| 6,952,155 B2 | 10/2005 | Himmelstein | |
| 7,027,842 B2 | 4/2006 | Zhang et al. | |
| 7,034,238 B2 | 4/2006 | Uleski et al. | |
| 7,050,818 B2 | 5/2006 | Tendler | |
| 7,092,723 B2 | 8/2006 | Himmelstein | |
| 7,113,091 B2 | 9/2006 | Script et al. | |
| 7,119,669 B2 | 10/2006 | Lundsgaard et al. | |
| 7,123,926 B2 | 10/2006 | Himmelstein | |
| 7,139,549 B2 | 11/2006 | Islam et al. | |
| 7,164,921 B2 | 1/2007 | Owens et al. | |
| 7,228,145 B2 | 6/2007 | Burritt et al. | |
| 7,305,243 B1 | 12/2007 | Tendler | |
| 7,400,886 B2 | 7/2008 | Sahim et al. | |
| 7,447,508 B1 | 11/2008 | Tendler | |
| 7,450,955 B2 | 11/2008 | Himmelstein | |
| 7,463,896 B2 | 12/2008 | Himmelstein | |
| 7,479,900 B2 | 1/2009 | Horstemeyer | |
| 7,482,952 B2 | 1/2009 | Horstemeyer | |
| 7,505,772 B2 | 3/2009 | Himmelstein | |
| 7,536,189 B2 | 5/2009 | Himmelstein | |
| 7,548,158 B2 | 6/2009 | Titus et al. | |
| 7,574,195 B2 * | 8/2009 | Krasner et al. | 455/404.2 |
| 7,580,697 B2 | 8/2009 | Lappe et al. | |
| 7,580,782 B2 | 8/2009 | Breed et al. | |
| 7,596,391 B2 | 9/2009 | Himmelstein | |
| 7,599,715 B2 | 10/2009 | Himmelstein | |
| 7,626,490 B2 | 12/2009 | Kashima | |
| 7,706,796 B2 | 4/2010 | Rimoni et al. | |
| 7,747,291 B2 | 6/2010 | Himmelstein | |
| 7,783,304 B2 | 8/2010 | Himmelstein | |
| 7,825,901 B2 | 11/2010 | Potera | |
| 7,844,282 B1 | 11/2010 | Tendler | |
| 7,873,374 B1 * | 1/2011 | O'Neil | 455/456.4 |
| 7,885,685 B2 | 2/2011 | Himmelstein | |
| 7,894,592 B2 | 2/2011 | Book et al. | |
| 7,902,960 B2 | 3/2011 | Tsuchimochi et al. | |
| 7,907,976 B2 | 3/2011 | Himmelstein | |
| 7,957,772 B2 | 6/2011 | Charlier | |
| 8,036,634 B2 | 10/2011 | DiMeo et al. | |
| 8,060,117 B1 | 11/2011 | Tendler | |
| 8,224,346 B2 | 7/2012 | Himmelstein | |
| 8,396,447 B2 | 3/2013 | Reich et al. | |
| 2001/0044302 A1 * | 11/2001 | Okuyama | 455/432 |
| 2002/0086718 A1 | 7/2002 | Bigwood et al. | |
| 2003/0227381 A1 | 12/2003 | Best, Jr. | |
| 2003/0231550 A1 | 12/2003 | Macfarlane | |
| 2004/0162064 A1 | 8/2004 | Himmelstein | |
| 2004/0183671 A1 | 9/2004 | Long | |
| 2005/0037730 A1 | 2/2005 | Montague | |
| 2005/0048948 A1 | 3/2005 | Holland et al. | |
| 2005/0099275 A1 | 5/2005 | Kamdar et al. | |
| 2005/0119030 A1 * | 6/2005 | Bauchot et al. | 455/564 |
| 2005/0197174 A1 | 9/2005 | Hasan et al. | |
| 2005/0222933 A1 * | 10/2005 | Wesby | 705/36 |
| 2005/0275505 A1 | 12/2005 | Himmelstein | |
| 2006/0049922 A1 | 3/2006 | Kolpasky et al. | |
| 2006/0061483 A1 | 3/2006 | Smith et al. | |
| 2006/0071804 A1 * | 4/2006 | Yoshioka | 340/636.1 |
| 2006/0165015 A1 * | 7/2006 | Melick et al. | 370/254 |
| 2006/0217105 A1 | 9/2006 | Kumar et al. | |
| 2006/0224305 A1 | 10/2006 | Ansari et al. | |
| 2006/0262103 A1 * | 11/2006 | Hu et al. | 345/173 |
| 2006/0288053 A1 | 12/2006 | Holt et al. | |
| 2007/0050248 A1 | 3/2007 | Huang et al. | |
| 2007/0053513 A1 * | 3/2007 | Hoffberg | 380/201 |
| 2007/0106897 A1 | 5/2007 | Kulakowski | |
| 2007/0142028 A1 | 6/2007 | Ayoub et al. | |
| 2007/0167147 A1 * | 7/2007 | Krasner et al. | 455/404.2 |
| 2007/0171854 A1 | 7/2007 | Chen et al. | |
| 2007/0203643 A1 | 8/2007 | Ramaswamy et al. | |
| 2007/0218923 A1 | 9/2007 | Park et al. | |
| 2007/0243853 A1 * | 10/2007 | Bumiller et al. | 455/404.1 |
| 2007/0264990 A1 * | 11/2007 | Droste et al. | 455/418 |
| 2007/0281603 A1 * | 12/2007 | Nath et al. | 455/1 |
| 2008/0039018 A1 | 2/2008 | Kim | |
| 2008/0080687 A1 | 4/2008 | Broms | |
| 2008/0139118 A1 | 6/2008 | Sanguinetti | |
| 2008/0140665 A1 | 6/2008 | Ariel et al. | |
| 2008/0143497 A1 * | 6/2008 | Wasson et al. | 340/425.5 |
| 2008/0150683 A1 | 6/2008 | Mikan et al. | |
| 2008/0177541 A1 | 7/2008 | Satomura | |
| 2008/0180237 A1 | 7/2008 | Fayyad et al. | |
| 2008/0208446 A1 | 8/2008 | Geelen et al. | |
| 2008/0243545 A1 | 10/2008 | D'Ambrosia et al. | |
| 2008/0285727 A1 * | 11/2008 | Burgess | 379/45 |
| 2009/0002145 A1 * | 1/2009 | Berry et al. | 340/436 |
| 2009/0099732 A1 | 4/2009 | Pisz | |
| 2009/0149153 A1 | 6/2009 | Lee | |
| 2009/0160607 A1 | 6/2009 | Edwards et al. | |
| 2009/0161836 A1 | 6/2009 | Oesterling | |
| 2009/0164053 A1 | 6/2009 | Oesterling | |
| 2009/0186596 A1 | 7/2009 | Kaltsukis | |
| 2009/0187300 A1 | 7/2009 | Everitt et al. | |
| 2009/0253403 A1 | 10/2009 | Edge et al. | |
| 2009/0261958 A1 | 10/2009 | Sundararajan | |
| 2009/0286504 A1 | 11/2009 | Krasner et al. | |
| 2010/0035598 A1 | 2/2010 | Lee et al. | |
| 2010/0048160 A1 * | 2/2010 | Lekutai | 455/404.1 |
| 2010/0058333 A1 | 3/2010 | Peterson | |
| 2010/0069018 A1 | 3/2010 | Simmons et al. | |
| 2010/0076764 A1 | 3/2010 | Chengalvarayan | |
| 2010/0097239 A1 | 4/2010 | Campbell et al. | |
| 2010/0190479 A1 | 7/2010 | Scott et al. | |
| 2010/0202368 A1 | 8/2010 | Hans | |
| 2010/0210211 A1 | 8/2010 | Price | |
| 2010/0227582 A1 | 9/2010 | Berry et al. | |
| 2010/0227584 A1 | 9/2010 | Hong | |
| 2010/0240337 A1 | 9/2010 | Dimeo et al. | |
| 2010/0253535 A1 | 10/2010 | Thomas et al. | |
| 2010/0273466 A1 | 10/2010 | Robertson et al. | |
| 2010/0323657 A1 * | 12/2010 | Barnard et al. | 455/404.1 |
| 2010/0323660 A1 | 12/2010 | Himmelstein | |
| 2010/0330972 A1 | 12/2010 | Angiolillio | |
| 2011/0003578 A1 | 1/2011 | Chen et al. | |
| 2011/0028118 A1 | 2/2011 | Thomas | |
| 2011/0059720 A1 | 3/2011 | Penix et al. | |
| 2011/0071880 A1 | 3/2011 | Spector | |
| 2011/0098016 A1 | 4/2011 | Hatton | |
| 2011/0201302 A1 | 8/2011 | Hatton | |
| 2011/0202233 A1 | 8/2011 | Hatton | |
| 2011/0225228 A1 | 9/2011 | Westra et al. | |
| 2011/0230159 A1 | 9/2011 | Hatton | |
| 2011/0275321 A1 | 11/2011 | Zhou et al. | |
| 2012/0028599 A1 | 2/2012 | Hatton et al. | |

(56) References Cited

U.S. PATENT DOCUMENTS

2012/0053782 A1 3/2012 Gwozdek et al.
2012/0264395 A1 10/2012 Bradburn et al.
2012/0281605 A1 11/2012 Himmelstein

FOREIGN PATENT DOCUMENTS

| EP | 2093982 | | 12/2007 |
|---|---|---|---|
| EP | 2037664 | | 3/2009 |
| EP | 2219163 | A1 | 8/2010 |
| JP | 2001043472 | | 2/2001 |
| JP | 2003022490 | | 1/2003 |
| JP | 2006005744 | | 1/2006 |
| JP | 2006270564 | | 10/2006 |
| WO | WO2008011432 | A2 | 1/2008 |

OTHER PUBLICATIONS

Ford Motor Company, "SYNC," Owner's Guide Supplement, SYNC Version 1 (Nov. 2007).
Ford Motor Company, "Navigation System: SYNC," Owner's Guide Supplement, SYNC Version 2 (Oct. 2008).
Ford Motor Company, "SYNC," Owner's Guide Supplement, SYNC Version 2 (Oct. 2008).
Wikipedia, "e-Call" project of the European Commission web page (e-Call—Wikipedia, the free encyclopedia).
"eCall Toolbox" web page (SafetySupport, 2005).
The Written Opinion of the International Searching Authority and International Search Report mailed Aug. 7, 2008 for PCT/US08/66878.
U.S. Appl. No. 11/769,346, filed Jun. 27, 2007, Joseph J. Berry et al. Method and System for Emergency Notification.
Kermit Whitfield, "A hitchhiker's guide to the telematics ecosystem", Automotive Design & Production, Oct. 2003, http://findarticles.com, pp. 1-3.
Office Action, Non-Final Rejection, dated Apr. 22, 2013.
EPO Search Report; 11153638.9-1525; mailed May 27, 2011.
PCT Search Report; PCT App. PCT/US10/027451; Mailed May 20, 2010.
EPO Extended Search Report; 11009966.0-2413; dated May 24, 2012.
EPO Search Report; 11154014.2-2414; dated May 31, 2011.
European MoU for Realisation of Interoperable in-Vehicle eCall; May 28, 2004; 7 Pages.
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Notice of Reasons for Rejections, JP2010-514958; Dec. 4, 2012; 3 pages.
Intellectual Property Office Examination Report; GB1117765.6; dated Aug. 22, 2013; 2 pages.

* cited by examiner

METHOD AND SYSTEM FOR EMERGENCY CALL HANDLING

TECHNICAL FIELD

The illustrative embodiments generally relate to a method and system for emergency call handling.

BACKGROUND

ONSTAR offers a SAFE & SOUND program in which a human "Advisor" fields emergency calls from ONSTAR-equipped vehicles. Calls are manually initiated at the vehicle either by depressing an emergency button located within the passenger compartment (e.g. below the rear-view mirror) or automatically initiated upon deployment of an air bag in the event of a collision. Collisions may be detected using one or more accelerometers or other impact detecting devices mounted within the vehicle.

An emergency call from an ONSTAR-equipped vehicle to the Advisor switchboard indicates the geographic location of the vehicle, and places the Advisor in voice communication with the passenger compartment. The Advisor attempts to communicate with the occupant(s) of the vehicle to determine the severity and circumstances of the incident giving rise to the emergency call. If the Advisor determines that emergency attention is necessary, either because of the occupant response(s), or because there was no response indicating that the occupant(s) may be ejected and/or severely injured, the Advisor dispatches emergency responders closest to the reported location of the vehicle.

U.S. Pat. No. 7,119,669 titled "Method And Apparatus For Detecting Vehicular Collisions" describes a cellular telephone that is equipped with technology for detecting a vehicular collision. This system is portable and operates independently, without the need of embedded vehicular subsystems, such as an accelerometer to detect collisions or a global positioning system to detect vehicle velocity and location. These subsystems are embedded into the cellular telephone described in the '669 patent. The '699 patent describes communicating electronic data, such as the magnitude, time and location of the collision to authorities in the even a collision is detected. The '699 patent also describes playing prerecorded messages about the device's owner, including medical information. The '699 patent describes various software "filters" for screening out "false positives" or "false collision detections" to avoid unnecessarily contacting emergency responders in non-emergency situations, such as when the cellular telephone is accidentally dropped.

U.S. Pat. No. 5,918,180 titled "Telephone Operable Global Tracking System For Vehicles" describes a system for tracking vehicles using a cellular telephone and global positioning system that is located in the vehicle. The system also includes a speech synthesizer circuit that converts the digitally-encoded coordinates into speech for enunciating the vehicle location through the cellular telephone. By calling the cellular telephone from a remote location, the owner of the vehicle can determine its location. The '180 patent also describes using the system to call the police.

U.S. Pat. No. 5,555,286 titled "Cellular Phone Based Automatic Emergency Vessel/Vehicle Location System" describes a navigation unit that receives GPS data, and upon receipt of an activation event such as an airbag deployment, causes DTMF tones to be generated in a cellular telephone for dialing an emergency responder. The geographic location information and the identity of the vehicle are synthesized into voice and are then communicated to the emergency responder using the cellular telephone connection.

SUMMARY

In one illustrative embodiment, a vehicle communication system includes a computer processor in communication with persistent and non-persistent memory. The system also includes a local wireless transceiver in communication with the computer processor. The local wireless transceiver may be configured to communicate wirelessly with a cellular telephone located at the vehicle. The persistent memory includes an application for execution by the computer processor to communicate an emergency call command signal from local wireless transceiver to the cellular telephone in the event a vehicle emergency is detected at the computer processor, causing the cellular telephone to place an emergency call to an emergency responder or agency over the cellular telephone network. Because vehicle power to the computer processor and local wireless transceiver may be lost in the event of an emergency, the system may also include a backup power circuit comprising a charge storage device such as a local battery or capacitor having enough charge to power the computer processor and local wireless transceiver long enough to initiate the emergency call at the cellular telephone.

In another illustrative embodiment, a vehicle communication system includes a computer processor in communication with persistent and non-persistent memory. The system also includes a local wireless network transceiver in communication with the computer processor. The local wireless network transceiver may be configured to communicate wirelessly with a remote wireless network transceiver connected to a computer network, such as the Internet.

The persistent memory includes an application for execution by the computer processor to communicate an emergency call signal from local wireless network transceiver to the remote wireless network transceiver in the event of an emergency at the vehicle. The remote wireless network transceiver converts the received signal into one or more packets for transmission over the computer network to notify an emergency responder or agency that an emergency has occurred at the vehicle. The packets may be routed to a network router to route the packets to the appropriate network address for addressing the emergency. The appropriate network address may be based on criteria including but not limited to the network address of the remote wireless transceiver, or the location of the vehicle as defined by vehicle location information included with the emergency call signal. The vehicle location information may be supplied to the computer processor at the vehicle by a global positioning system. The packets may include data or attributes identifying the packets as emergency call packets for facilitating routing through the computer network.

One or more illustrative embodiments may include an apparatus and process for maintaining continuous connectivity between the vehicle emergency response module and at least one cellular telephone or other wireless communication device within the vehicle. Appropriate notifications and status indicators may be provided to inform vehicle occupants that connectivity is established, or broken.

In addition to notifying vehicle occupants, in one or more illustrative embodiments it may be desirable to notify a control system within the vehicle of the status of am emergency call. For example, this could be useful in determining if a call is connected, dropped, transferred, etc. According to a one aspect of the illustrative embodiments, upon the activation of one or more crash-related sensors, for example, a restraint control module (RCM) that an eCall is being placed.

In illustrative embodiments, the call may continue to be transmitted until a confirmation state is set within a vehicle system. The confirmation state could confirm the answer of the call, or it could confirm that an actual operator has taken an action, or any other suitable call connection event. In these illustrative embodiments, once the call connection has been confirmed, the vehicle may stop attempting to place a call.

Additionally, in one or more illustrative embodiments, while an eCall is being placed, all other types of calls and data transfer may be blocked or otherwise suspended. This may help ensure that the resources of a nomadic device, such as a cell phone, PDA, etc., through which the call is being placed, are being used for the appropriate purpose.

Further, in one or more illustrative embodiments, when a crash is detected, a vehicle system may activate an SOS mode. The SOS mode may include, but is not limited to, activation of audible vehicle outputs such as the vehicle horn. Such noise may interfere with a call being placed, and, resultantly, the vehicle horn or other audible outputs (alarm, etc.) may be silenced while an eCall is being placed.

In one or more additional illustrative embodiments, an eCall transceiver or equivalent device may cause a call to be placed and/or transmit the status of an attempted call to other vehicle systems. A non-limiting list of exemplary status transmissions includes, but is not limited to: Call in Progress, Unsuccessful, Call Complete, Canceled, Configured OFF, and Normal. Other appropriate status conditions could also be transmitted.

In yet further illustrative embodiments, a driver/passenger may elect to make a call private. This transfers control of the call from a vehicle system (mic and speakers) to the nomadic device through which the call is being made. Additionally, many vehicles automatically terminate vehicle power if the vehicle is turned off and/or the vehicle door(s) are opened. While useful for turning off, for example, the radio, such a system would typically result in cessation of a call. In order that the call not be lost, when such an event occurs (e.g., vehicle turned off, and/or doors opened), control of the call is automatically transferred to the nomadic device. This prevents calls being lost if the passenger must flee the vehicle due to risk of fire or other hazard, or if the passenger simply wishes to leave the vehicle, but continue the call.

Yet another aspect of one or more illustrative embodiments activates the cellular telephone to dial a telephone number of a predefined contact other than an emergency responder, and communicate the speech signals to the predefined contact.

These aspects of illustrative embodiments are not exclusive. Other aspects of the present invention are detailed in the following detailed description of the preferred embodiments, the accompanying figures and claims.

These figures are not exclusive representations of the systems and processes that may be implemented to carry out the inventions recited in the appended claims. Those of skill in the art will recognize that the illustrated system and process embodiments may be modified or otherwise adapted to meet a claimed implementation of the present invention, or equivalents thereof.

DETAILED DESCRIPTION OF ILLUSTRATIVE EMBODIMENTS

Figure 1:
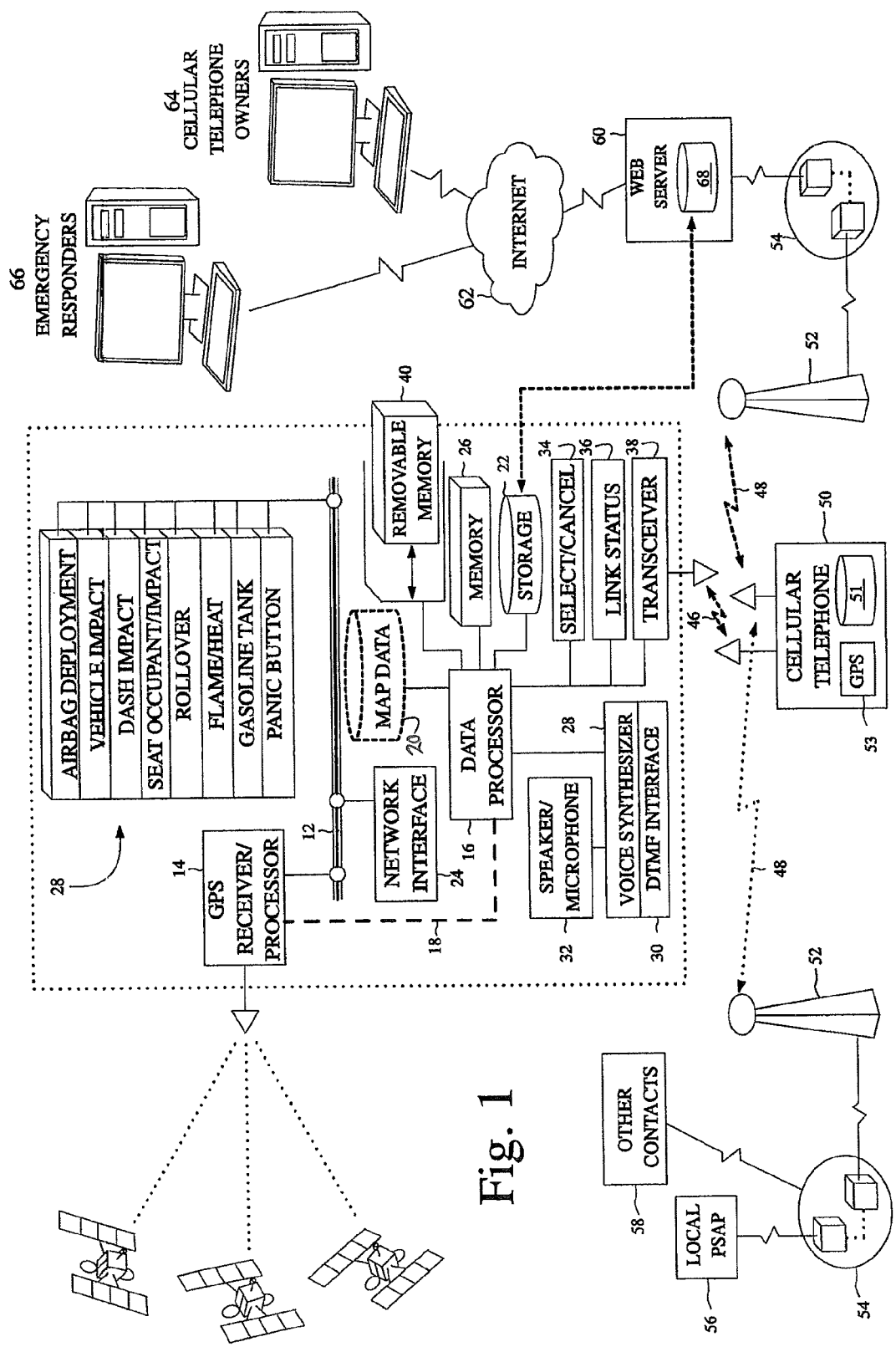
FIG. 1 is a system diagram illustrating exemplary physical aspects of one or more illustrative embodiments.

FIG. 1 illustrates a non-limiting physical system architecture which may be implemented to practice one or more illustrative embodiments. Block 10 generally comprises vehicle sub-systems, some of which may be interconnected by a vehicle network 12 such as a Controller Area Network or other suitable communication network.

Data processor 16 may receive and send information across vehicle network 12 through an appropriate network interface or bus adapter 24. Data processor 16 may be a traditional RISC or CISC processor in bus communication with general purpose volatile memory 26, and general purpose non-volatile or persistent storage 22, such as magnetic or flash memory, as is well known in the art. Removable memory 40 may also be provided, such as a compact flash card or a flash memory module having a Universal Serial Bus (USB) interface (not shown).

A global positioning signal receiver/processor 14 may be implemented to receive radio signals (e.g. the L1 frequency of 1575.42 MHz in the UHF band) from multiple satellites of the Navigation Signal Timing and Ranging (NAVSTAR) Global Positioning System. These signals may include a pseudorandom code identifying the transmitting satellite, ephemeris data and almanac data. The global positioning signal receiver/processor 14 may process this data to determine the two-dimensional location (e.g. latitude and longitude), the three-dimensional location (e.g. latitude, longitude and altitude), the velocity and/or the direction of the vehicle. Location, velocity and/or direction information calculated at the global positioning signal receiver/processor 14 may be communicated across vehicle network 12, and/or directly to data processor 16 via link 18.

Alternatively, a global positioning signal receiver/processor 53 may be a subsystem of cellular telephone 50. Information representing the global position of the cellular telephone, and thus the vehicle in which the cellular telephone is located, may be retrieved by data processor 16 via transceiver 38 and communication link 46.

The vehicle sub-systems may include a map database 20. Database 20, like general storage 22, may take several forms including but no limited to magnetic storage (e.g. a hard drive), optical storage (e.g. CD-ROM, DVD), flash memory, etc. Data processor 16 may determine a present street location and heading of the vehicle based on latitude, longitude and direction data received from GPS receiver/processor, and map data retrieved from database 20, as is well known in the art.

A plurality of emergency condition sensors 28 may be interfaced to vehicle network 28. Such sensors may include but are not limited to air bag deployment sensors, vehicle impact sensors, dash impact sensors, seat/occupant impact sensors, rollover sensors, flame/heat sensors, gasoline sensors and an occupant-activated panic button. These sensors may operate within individual processing modules (not shown), each having a separate interface (not shown) to the vehicle network 12 for sending signals indicating a plurality of different emergency conditions.

Another subsystem in communication with data processor 16 includes a voice synthesizer or decoder 28 for converting digital information received from the data processor 16 into audible speech signals, i.e. analog sound signals. The analog sound signals may be communicated through speaker 32, or processed at transceiver 38, for communication to cellular telephone 50 transceiver (not shown) across piconet 46 as discussed in greater detail below. A dual-tone multifrequency (DTMF) interface 30 may be provided for receiving analog DTMF frequencies and processing them as command signals to data processor 16, as is well known in the art of automated telephone menu systems.

Transceiver 38 may establish a piconet 46 with cellular telephone 50 or other available device. Cellular telephone 50 is an example of a transient cellular communication device that is not permanently integrated into the vehicle. Another example of a transient cellular communication device may be a laptop computer having cellular communication and piconet communication capabilities.

In one example, transceiver 38 may comprise a BLUETOOTH controller. Those of skill in the art will recognize that other transceivers may be used having different communication characteristics and performance. Other vehicle subsystems include a link status indicator 36 for notifying vehicle occupants of the status of the communication link between transceiver 38 and cellular telephone 50. Statuses include, but are not limited to, available devices, paired, unpaired, connected, not connected, etc. In one illustrative embodiment, the status of the communication link is indicated on a liquid crystal display (LCD). In another illustrative embodiment, one or more light emitting diodes (LEDs) or other visual indicators are provided. In yet another illustrative embodiment, audible status notifications are provided through the vehicle sound system and/or speaker 32. Link status may be monitored by data processor 16 in conjunction with transceiver 38.

A select/cancel switch 34 may also interface with data processor 16 for push-button control over microprocessor/system functions as described in greater detail below. Select/cancel switch 34 may be a soft switch operating in conjunction with a LCD display, or a software switch operated by voice command received at microphone 32 and processed by voice synthesizer 28 and/or microprocessor 16.

A wide variety of different interconnections among subsystems and external communication networks may be practiced within the scope of the present invention, beyond those illustrated in FIG. 1. For example, a hard wire connection may be established between cellular telephone 50 and data processor 16, voice synthesizer 28, and/or DTMF interface 30. In another example, data processor 16 may be connected directly or indirectly to emergency sensor modules 28, and may monitor the ports to which the emergency sensor modules are attached instead of vehicle network 12.

In one or more illustrative embodiments, cellular telephone 50 establishes wireless communication 48 with terrestrial tower 52. Terrestrial tower 52 in turn established communication through telephone switching network 54 with emergency responder(s) 56. Emergency responders may include police, ambulance, a 911 public safety access point (PSAP), etc. as described in greater detail below. Terrestrial tower 52 may also establish communication through telephone switching network 54 with other contacts 58, as described in greater detail below. Based on the GPS position, for example, a call may be placed to the PSAP that is local to the vehicle's present position.

In one or more illustrative embodiments, terrestrial tower 52 may establish communication through telephone switching network 54 with a data interface (not shown) at web server 60. As described in greater detail below, data may be uploaded and downloaded communicated from associated database 68 to/from storage 22 associated with microprocessor 16, as illustrated by dashed line 70.

Web server 60 having associated storage 68 may host a plurality of web pages for Internet access 62 by a plurality of browsers, including but not limited to emergency responder(s) 66, cellular telephone owner(s) 64, healthcare providers, etc. As described in greater detail below, some browsers, such as cellular telephone owners 64 may upload data over Internet 62 to storage 68, and other browsers, such as emergency responders 66 may download data.

Figure 2:
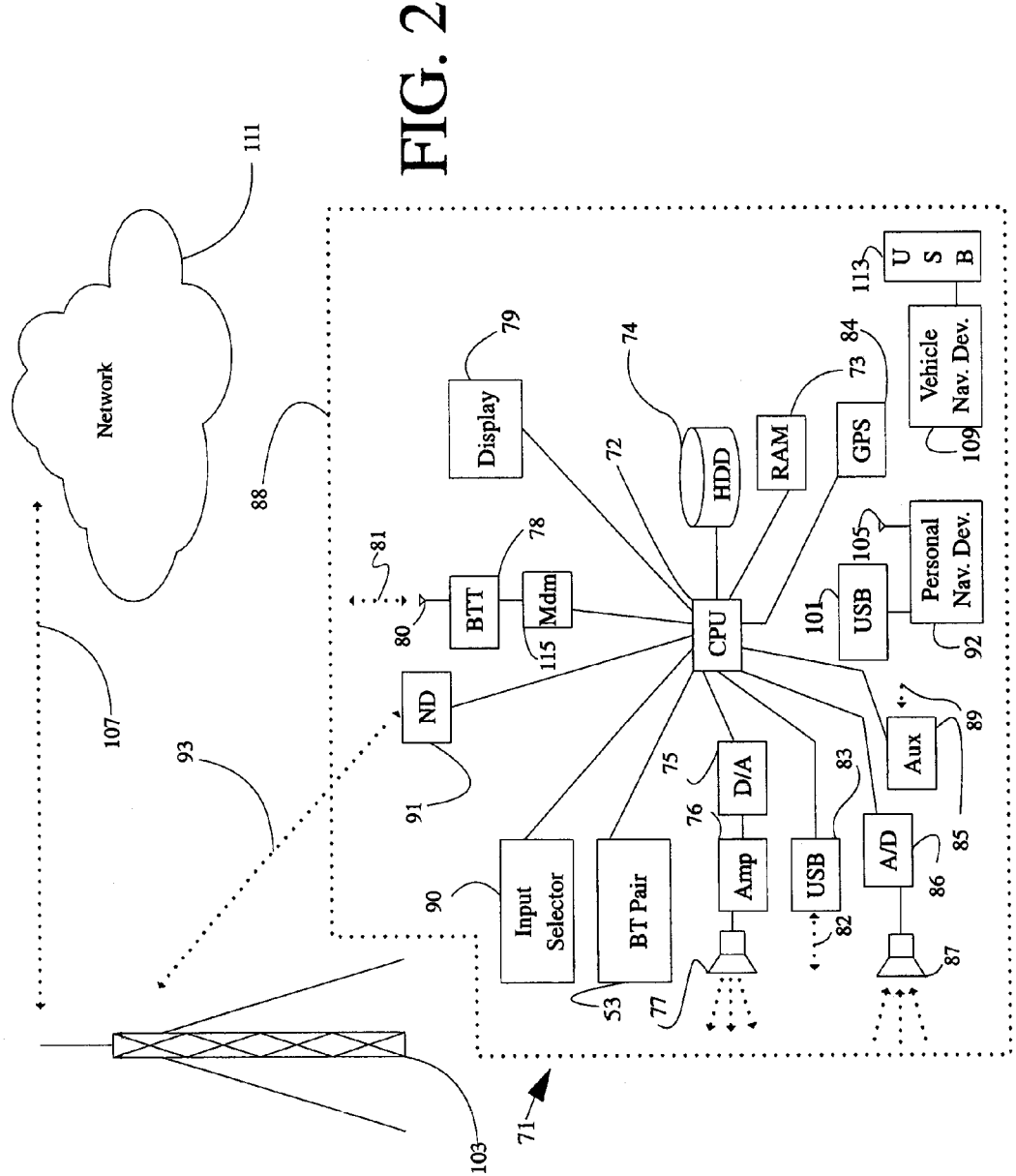
FIG. 2 is another exemplary system usable to implement the illustrative embodiments.

FIG. 2 illustrates system architecture of a second exemplary illustrative onboard communication system which can make use of the illustrative embodiments. A vehicle enabled with a communication system (VCS) may contain a visual front end interface 79 located in the vehicle. The user may also be able to interact with the interface if it is provided, for example, with a touch sensitive or capacitive touch screen. In another illustrative embodiment, the interaction occurs through audible speech and speech synthesis.

In the illustrative embodiment 71 shown in FIG. 2 a processor 72 controls the operation of the system. Provided within the vehicle itself, the processor allows onboard processing of commands and routines. Further, the processor is connected to both temporary 73 and permanent storage 74. In this illustrative embodiment, the temporary storage is random access memory (RAM) and the permanent storage is a hard disk drive (HDD) or flash memory.

The processor is also provided with a number of different inputs for the user to interface with the processor. In this illustrative embodiment, a microphone 87, an auxiliary input 85 (for input 89), a USB input 83, a GPS input 84 and a BLUETOOTH input 78 are all provided. An input selector 90 is also provided, to allow a user to swap between various inputs. Alternatively, inputs may be automatically selected using circuitry and programming to determine at which input a signal is available. In one embodiment, this may be accomplished by comparing signals or signal levels at the various inputs. Input to both the microphone and the auxiliary connector is converted from analog to digital by a converter 86 before being passed to the processor.

Outputs to the system can include, but are not limited to, a visual display 79 and a speaker 77 or stereo system output. The speaker is connected to an amplifier 76 and receives its signal from the processor 72 through a digital-to-analog converter 75. Output can also be made to a remote BLUETOOTH device (not shown) or a USB device (not shown) along the bi-directional data streams shown at 81 and 82 respectively. Alternatively, audio output may be channeled through the vehicles audio/stereo system.

In one illustrative embodiment, the system 71, uses the BLUETOOTH transceiver 78 to communicate 80 with a user's nomadic device 91 (e.g., cell phone, smart phone, PDA, etc.). The nomadic device can then be used to communicate 107 with a network 111 outside the vehicle 88 through, for example, communication 93 with a cellular tower 103.

Pairing a nomadic device 91 and the BLUETOOTH transceiver 78 can be instructed through a button 91 or similar input, telling the CPU that the onboard BLUETOOTH transceiver will be paired with a BLUETOOTH transceiver in a nomadic device.

Data may be communicated between CPU 72 and network 111 utilizing a data-plan associated with nomadic device 91. Alternatively, it may be desirable to include an onboard modem 115 in order to transfer data between CPU 72 and network 111 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 91 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). If the user has a data-plan associated with the nomadic device, it is possible that the data-plan allows for broad-band transmission and the system could use a much wider bandwidth (speeding up data transfer). In still another embodiment, nomadic device 91 is replaced with a cellular communication device (not shown) that is affixed to vehicle 88.

In another alternative embodiment, CPU 72 may interface with a LAN/WAN wireless transceiver (not shown) for communicating with Network 111 via non-cellular wireless link, such as Wi-Fi, WIMAX, etc. Nomadic device 91 may include the LAN/WAN wireless transceiver.

Additional inputs and or devices may include a personal navigation device 92, having, for example, a USB connection 101 and/or an antenna 105, or a vehicle navigation device 109, having a USB 113 or other connection, an onboard GPS device 84, or remote navigation system (not shown) having connectivity to network 111.

Figure 3:
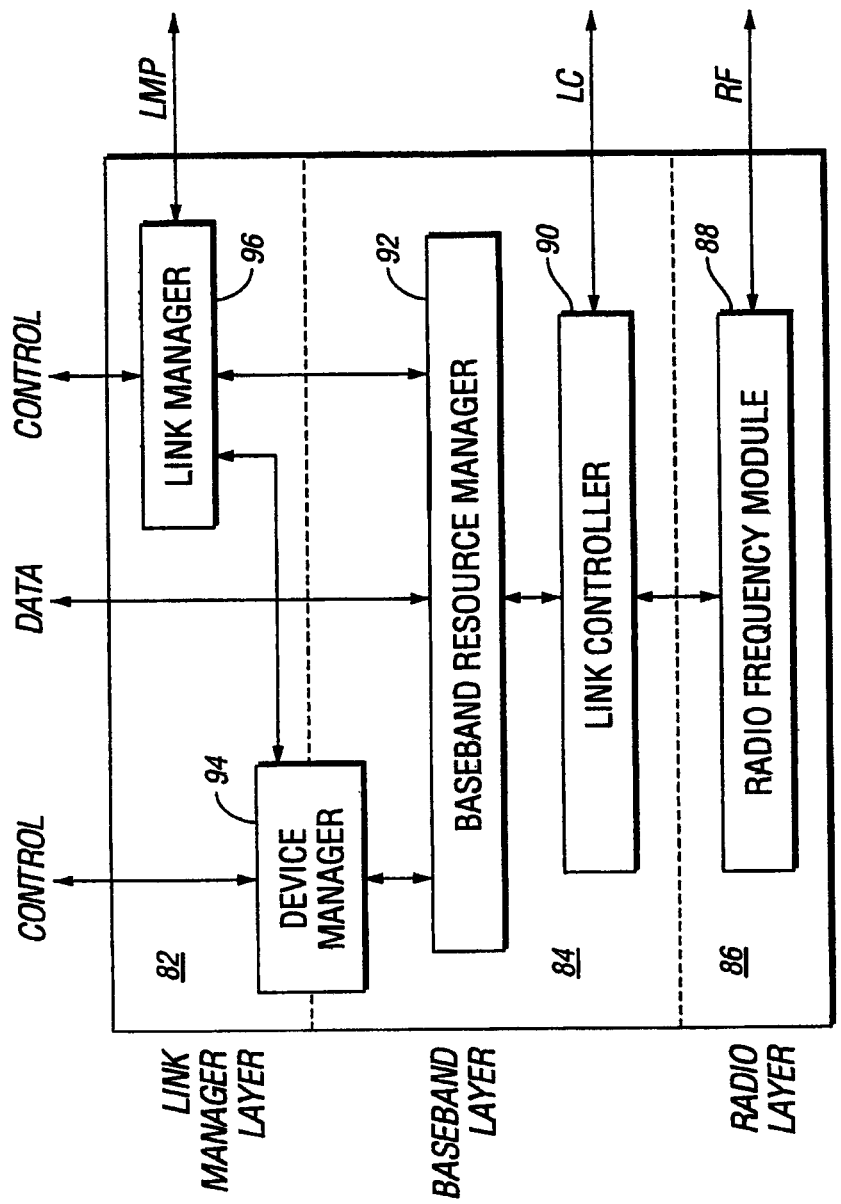
FIG. 3 is a block diagram of a BLUETOOTH controller which may be implemented to support the illustrative embodiments.

As illustrated in FIG. 3, a BLUETOOTH controller may include a link manager layer 94, a baseband layer 95 and a radio layer 96. In an illustrative embodiment, the radio layer 96 may include a radio frequency module 97 operating at 2.4 GHz using binary frequency modulation.

Baseband layer 95 may include a baseband resource manager 99 for managing the exchange of data between connected devices over logical links and logical transports, as well as the use of the radio medium to carry out inquiries, make connections, or be discoverable.

Baseband layer 95 may also include a link controller 98 which handles encoding and decoding of BLUETOOTH packets from the data payload and parameters related to the physical channel, logical transport and logical link. The link controller 98 carries out the link control protocol signaling that is used to communicate flow control and acknowledgment and retransmission request signals.

Device manager 100 controls the general behavior of the BLUETOOTH enabled device. It is responsible for operation of the BLUETOOTH system that is not directly related to data transport, such as inquiring for the presence of other nearby devices, connecting to other devices or making the local device discoverable or connectable by other devices.

The link manager layer 94 may include a link manager for managing the creation, modification, and release of logical links and/or logical transports, as well as the update of parameters related to physical links between devices. The link manager may achieve this by communicating with the link manager in remote BLUETOOTH devices using the link management protocol (LMP). The LMP allows the creation of new logical links and logical transports between devices when required, as well as the general control of link and transport attributes such as the enabling of encryption on the logical transport, the adapting of transmit power on the physical link or the adjustment of QoS settings for a logical link.

Figure 4:
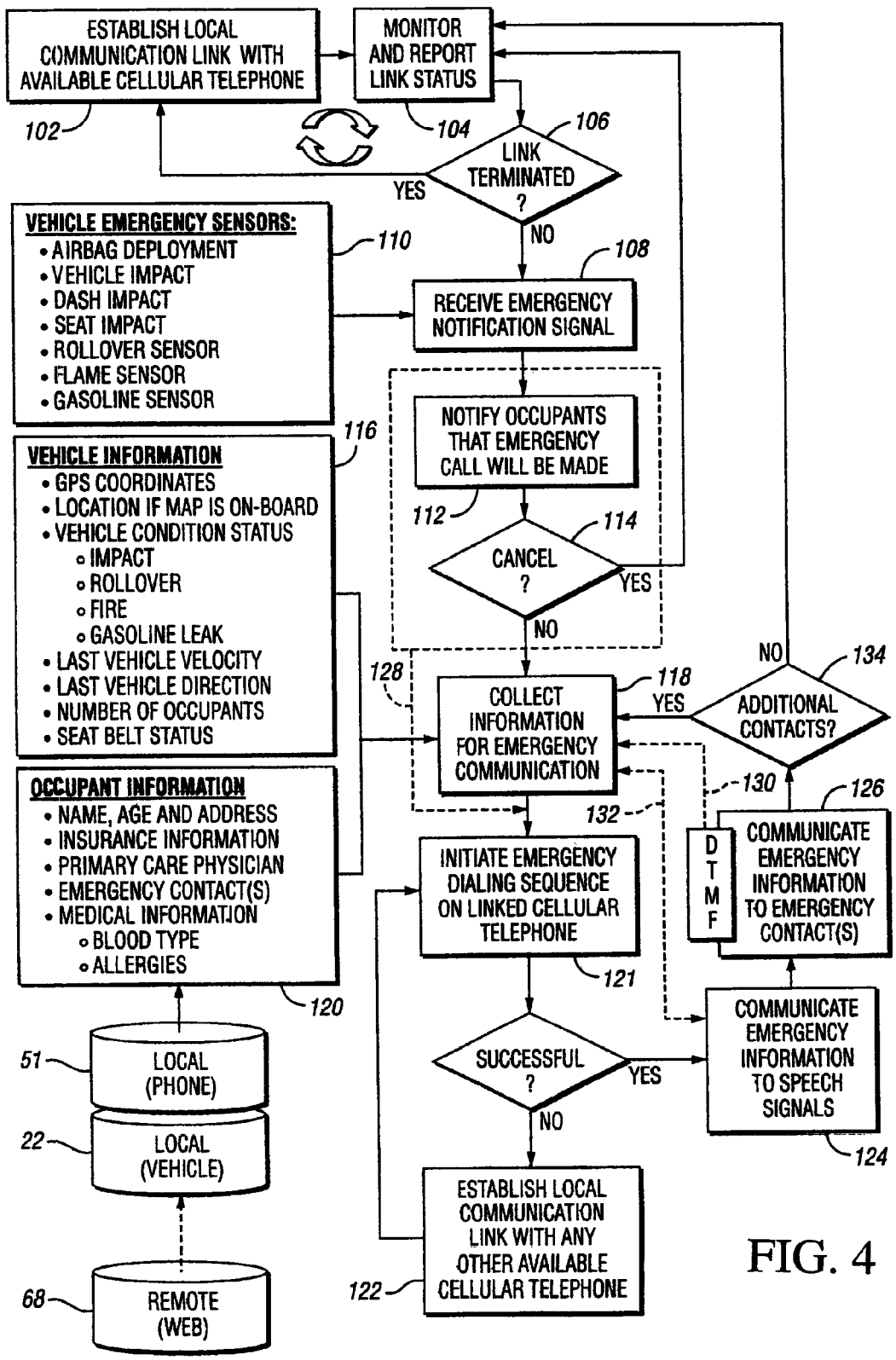
FIG. 4 is a flow diagram illustrating an exemplary process of one or more illustrative embodiments.

FIG. 4 illustrates an example algorithm for implementing one or more illustrative embodiments. Those of skill in the art will recognize that the scope of the present invention is not limited to the specific algorithm illustrated in FIG. 4. The illustrated process may be modified to fit any illustrative embodiments. The processes illustrated in FIG. 4 may be implemented by one or more processors, such as data processor 16 illustrated in FIG. 1. No particular type of processor or configuration is required.

At step 102, a local communication link may be established with an available cellular telephone in or nearby the vehicle passenger compartment. The link may be a BLUETOOTH piconet, or other suitable short-range network, wired or wireless. At steps 104 and 106, the status of the communication link may be monitored on a continuous or basis, or at regular intervals. The status of the link may include the connectivity of the paired cellular telephone, the signal strength, the identity of other available devices, etc. described with respect to FIG. 1, link status may be reported by LCD display, LED, or audibly. Preferably, a warning or other notification is provided to passengers within the vehicle compartment when a link is disrupted, or when no link is available.

At step 108, an emergency notification signal is received from vehicle emergency sensors 110. Vehicle emergency sensors 110 may include but are not limited to: air bag deployment sensors, air curtain deployment sensors, thorax deployment sensors, knee bolster deployment sensors, adaptive can vent and/or tether deployment sensors vehicle impact sensors, dash impact sensors, seat impact sensors, rollover sensors, flame sensors, gasoline sensors, fuel cutoff sensors, etc. Emergency signals from these sensors may be received at data processor 16 directly by wire, wirelessly, or over vehicle network 12.

Upon receipt of an emergency notification signal, the system may notify occupants of the vehicle, at step 112, that an emergency call to one or more emergency responders 56 or other contacts 58 is going to be made at cellular telephone 50. Occupant notification is preferably done audibly using voice synthesizer 28 and speaker 32 which may or may not be a component of the vehicle sound system. The following is an example notification:

"Warning. A safety sensor in this vehicle has detected a vehicle collision. The vehicle safety system will automatically contact emergency responders in 10 seconds. Press your cancel button or say CANCEL if you want to terminate this call."

Of course, an unlimited number of different notifications may be provided. They may be pre-recorded, pre-defined, or dynamically created based on the particular emergency detected and/or the particular occupant(s) within the vehicle. The notification may also be repeated one or more times. At step 114, the vehicle occupants are provided with an opportunity to cancel the emergency call using the select/cancel switch 22 or a voice command received at microphone 32 and voice synthesizer 28. If a cancellation signal is received, the process stops, and returns to monitoring link status at block 104.

If the emergency call is not terminated at 114, emergency information is collected at step 118. Emergency information may include vehicle information 116 and occupant information 120. Vehicle information 116 may include latitude, longitude, direction, last velocity, etc from GPS receiver/processor 14, street location if the vehicle is equipped with map data 20, vehicle type/color, vehicle emergency condition (e.g., impact, fire, rollover, fire, gasoline leak, etc.), number of occupants, seat belt status, etc. Occupant information 120 may include name, age, address, blood type, medical allergies, medical condition, insurance information, physician information, emergency contact(s), etc. Emergency information may be stored in a plurality of storage locations including memory 26, storage 22, removable memory 40, or storage 51 associated with cellular telephone 50.

Occupant identification may be determined by the owner of the cellular telephone 50 paired with transceiver 38, voice input at microphone 32, user input at a vehicle console display (not shown), or other means including key identifier, memory key identifier, etc.

After emergency information is collected at step 118, another occupant notification may be made warning the occupant(s) that an emergency call is going to be made, and providing the occupant(s) with an opportunity to cancel the call, as described above with respect to steps 112 and 114. This step is represented by dashed lines 128.

If the emergency call is not canceled, transceiver 38 such as a BLUETOOTH controller may initiate a call on cellular telephone 50 to one or more emergency responders 56 or other contacts 58 at step 121. If a call cannot be initiated, the system attempts to establish connection with another cellular telephone in or nearby the vehicle as represented at block 122, and communicate the emergency information as represented at block 121.

At step 124, elements of vehicle information 116 and/or occupant information 120 may be synthesized into speech signals at voice synthesizer 28 and read to the terminating party 56 or 58 as indicated at block 126. In one or more illustrative embodiments, the data processor 16 and the voice synthesizer 28 provide the terminating party 56 or 58 with touch tone DTMF menu options for repeating and retrieving the various elements of vehicle information 116 and/or occupant information 120. This process is illustrated with dashed lines 130 and 132.

If the occupant(s) have identified additional contacts 58 for reporting emergency information, those entities may be contacted, and emergency information may be reported, as represented by step 134.

As illustrated in FIG. 1, emergency responders 66 and cellular telephone/vehicle owners 64 may be provided with Internet access to web server 60 having associated storage 68. Cellular telephone/vehicle owners 64 may access one or more Web pages hosted at server 60 for defining the emergency information to be provided to emergency responders 56 and 66, and/or the manner in which that information is provided. For example, cellular telephone/vehicle owners 64 may specify their name, age (date of birth), address, blood type, medical allergies, medical conditions, physician, emergency contact persons, etc. Cellular telephone/vehicle owners 64 may specify which of this information is disclosed to emergency responders 56 and/or 66 in the event of an emergency. The emergency information may be uploaded to cellular telephone storage 51 via cellular link 48, and/or to in-vehicle storage 22 for reporting via voice synthesizer 28 to emergency responders 56 and other contacts 58 in the event of an emergency.

The emergency information may also be stored in a database 68 associated with web server 68 for Internet access by emergency responders 66 in the event of an emergency. In one embodiment, speech transmission to emergency responders 56 includes instructions for accessing occupant emergency information at server 60 over the Internet 62. In this manner, emergency responders 56 and/or 66 can readily access all of an occupant's emergency information.

Figure 5:
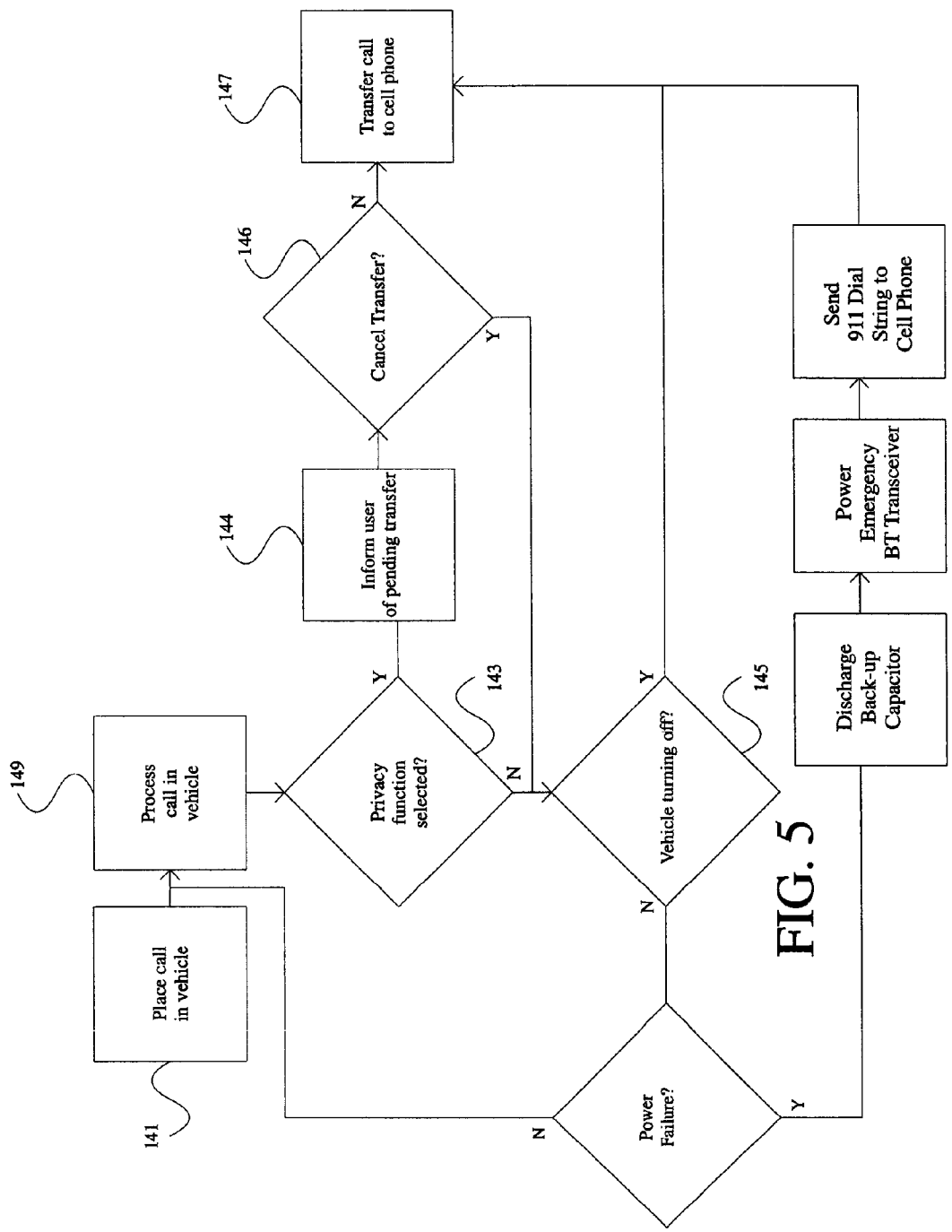
FIG. 5 is an exemplary flow showing one or more possible selectable and/or automatic transmission modes for an eCall in progress.

FIG. 5 is an exemplary flow showing one or more possible selectable and/or automatic transmission modes for an eCall in progress. Typically, when an eCall is placed, with above-described embodiments, incoming voice is played through vehicle speakers and outgoing voice is recorded at a vehicle based microphone 141. In certain instances, however, it may be desirable to have the call transferred to the nomadic device, eliminating the vehicle systems.

One non-limiting example would be if the system 71 is provided with a privacy function. If a privacy function is selected 143, the call might be transferred to the nomadic device 147. The user might also be given a notification or a warning that this is about to occur 144, and be given an opportunity to physically or verbally cancel the transfer 146. As one example, if the vehicle was in an accident, and a user was trapped, and something shifted and triggered the privacy feature. The user may be unable to physically cancel the transfer to an unreachable cell phone, so the user would vocally cancel the transfer. On the other hand, local noise (e.g. kids, traffic, etc) might make the call hard to hear and/or might make it hard for the operator to hear the user, so it might be desirable to transfer the call to a handset.

Even if a user-directed transfer is not processed, it may be desirable to transfer the call automatically 145. One non-limiting example of a situation where this could occur is if the vehicle power was turned off or fails. In one embodiment, if the vehicle is turned off, the call can be automatically transferred before the power down occurs, so the call is not lost. In such a case, CPU 72 would cause the call to be transferred to the nomadic device 147.

In an alternative embodiment, circuitry may be implemented for a situation in which vehicle power fails or is lost due to an accident or other event as illustrated in block 300. One aspect of the circuitry may include a capacitor having and holding a certain charge while the vehicle is under normal 12 volt electrical power. In the event vehicle power is lost, the circuitry may discharge enough charge from the capacitor to power a BLUETOOTH transceiver as illustrated in blocks 301 and 302. The BLUETOOTH transceiver then generates a dial string for transmission to the Nomadic device to make an emergency call and notify emergency responders that an accident has occurred as indicated in block 303.

In one non-limiting implementation of this embodiment, the dial string may include a series of commas before "911" to permit the occupant to cancel the emergency call if it is unnecessary.

Figure 6:
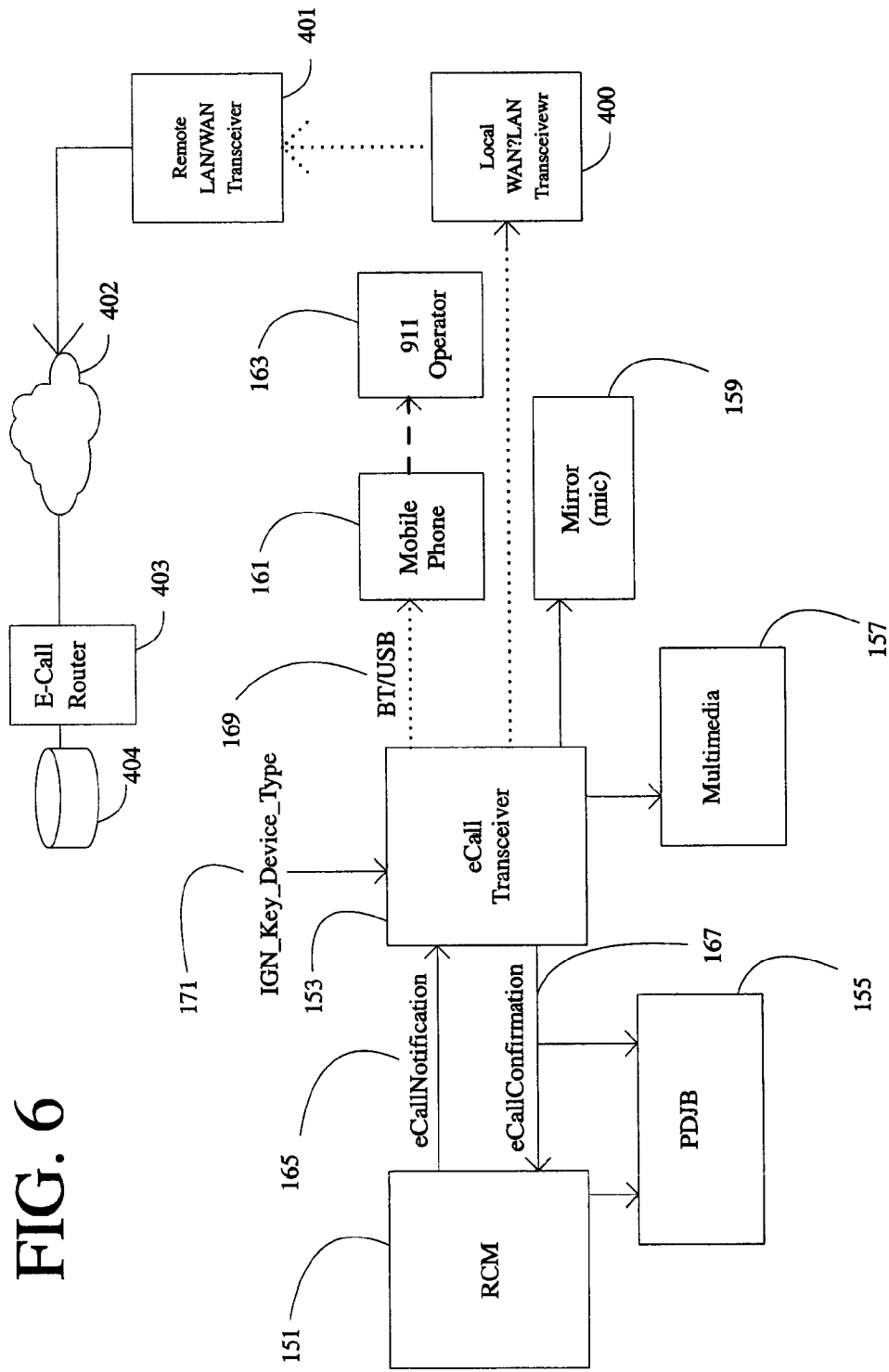
FIG. 6 is an exemplary illustrative diagram of an exemplary system for placing an eCall.

FIG. 6 is an exemplary illustrative diagram of an exemplary system for placing an eCall. Exemplary vehicular devices include an RCM 151, an eCall receiver 153, a mirror (or other physical installation) containing a microphone 159, one or more media outputs 157, and a power distribution juncture box 155 (PDJB).

According to one or more illustrative embodiments, when the RCM or equivalent device registers a qualified crash event, the RCM notifies 165 the eCall receiver.

The eCall receiver may have several functions to perform. It may remain in contact with the RCM 167 to report when a call has been placed. This may permit the RCM to stop requesting a call from eCall receiver 153. It may also receive user input through a microphone, and play back operator input through a media output. Additionally, the eCall receiver 153 may maintain a BLUETOOTH, USB, etc. connection to a nomadic device 161, through which a call can be placed to a 911 operator 163.

The PDJB may, among other things, activate SOS features when a crash occurs. These could include flashing lights, honking horns, car alarms, etc. Since some of these features might interfere with a call, the PDJB may terminate the interfering features when a call is being placed and/or is connected. This will allow the driver to more easily communicate with the 911 operator.

In one non-limiting example, the horn and other audible devices are suppressed as long as a call is recognized as being in progress. In any other condition, the SOS signals, such as the horn, continue to sound in order to draw attention to the accident.

Further, it may be prohibited in certain areas to have a 911 autodialer, or a user may simply want to avoid calling 911 in the event of a minor crash. In these cases, among others, the vehicle may play a message to the driver when a 911 call is going to be placed. This could allow the driver an opportunity to cancel the outgoing call.

In at least one illustrative embodiment, a restraint control module (RCM) 151 and an eCall transceiver 153 are in communication with one another. In one embodiment, the RCM may regularly transmit a signal indicating that no eCall is requested. This signal can be updated, for example, every 150 ms, or any suitable update period.

Once a crash event is detected by the RCM (or other emergency detection module or system), on the next update (or upon the event if periodic communication is not implemented), the RCM 151 can send a signal requesting that eCall transceiver 153 make an eCall. The eCall transceiver 153 might also be in communication with the RCM, such that messages can be sent back. For example, when receiving a no-request signal, the eCall transceiver can reply with a signal indicating that no call has been requested. If a call request comes through, the eCall transceiver can transmit back a variety of signals to the RCM, including, but not limited to: call in progress, call completed, call canceled, call unsuccessful (e.g., no phone is connected for calling), or eCall is turned OFF. Additional or fewer communication states can be used as needed.

For example, if the RCM transmits a request for a call, it may continue transmitting the request as long as it is being signaled that a call is requested. Once the call has been, for example, placed, completed, cancelled, determined unsuccessful, etc., the RCM may return to transmitting a signal that no call is requested. Note, in this case, no call requested signal does not indicate that a call should be terminated, but rather, that one is not requested to be placed.

If the response is invalid, corrupted, not received, etc., the RCM might register the last valid received state as the presently received state. In such a case, if no indication that the call had been placed, completed, etc. had been validly received, then the RCM might continue to request a call. Or, if there is no last valid state saved, the RCM might default to registering a "normal" (i.e. no call placed) state, causing the request to again continue. This helps ensure that a call is requested until the RCM confirms the call has been placed.

In the event an eCall is requested and not canceled, eCall transceiver 153 may operate nomadic device 161 (e.g. mobile phone, PDA, etc.) to dial "911" or another emergency number. In one embodiment, eCall transceiver 153 may communicate with CPU 72 (FIG. 2) which in turn communicates with nomadic device 161. In an alternative embodiment, a wireless telephone may be fixed to the vehicle, or otherwise regularly travel with the vehicle.

In yet another alternative embodiment, the eCall transceiver 153 may include or be in communication with a wireless network access transceiver 400. Wireless network access transceiver 400 may be configured to communicate with a Wireless Local Area Network (LAN), Wide Area Network (WAN), Wi-Fi network, or the like, if such a wireless network exists within the vicinity of the vehicle.

In the event an emergency call is requested, the local LAN/WAN transceiver 400 at the vehicle may communicate wirelessly with a remote LAN/WAN transceiver 401 located remotely from the vehicle. Remote LAN/WAN transceiver 401, upon receiving a request for emergency call, may establish a connection with "911" call center 163. The connection may be established over network 402 (e.g. Internet) or by telephone switch. In one embodiment, an emergency call network switch 403 may be implemented to route an emergency call received at WAN transceiver 401 to the nearest 911 call center 163. In one embodiment, the IP address of the LAN/WAN transceiver 401 may be used to determine the approximate location of LAN/WAN transceiver 401. A lookup table 404 may be accessed to determine the IP address or telephone number of the nearest 911 call center to the location or IP address of the LAN/WAN transceiver 401. In another embodiment, the location of the vehicle may be determined by GPS module 84 (FIG. 2). That location may be communicated through local LAN/WAN transceiver 400 to remote WAN transceiver 401 together with the emergency call request. Emergency call switch 403 may receive this information and access look-up table 404 to determine the nearest 911 call center 163 based on the GPS information received from the GPS module 84. That nearest call center 163 may then be contacted by telephone, by network connection, or otherwise.

In an alternative embodiment, GPS module 84 may be an integral component of nomadic device 161. Vehicle location may be determined by accessing the GPS module 84 located within the nomadic device 161 or located within system 88 (FIG. 2).

Local WAN transceiver 400 is not limited to the proximity of a vehicle. It may be a component of a nomadic device (e.g. mobile phone, PDA, etc.), or even a hand-held device. A traditional LAN/WAN router/access point could also be configured to transmit an emergency call. The emergency call could be triggered by a button on the LAN/WAN network access device, or by another device that is in communication with the LAN/WAN network access device. In other words, a "telephone" is not necessary to make an emergency call utilizing this aspect of the present invention. Any network access point anywhere (not limited to a vehicle) could be configured to contact emergency call switch 403 for locating and contacting 911 call center 163 in the event of an emergency. This includes network access points located in the home, office, and those embedded within personal computers, laptop computers, cellular telephones and PDAs. Alternatively, network access points such as LAN/WAN routers may be configured to identify the IP address or other identifying information (such as telephone number) of the local 911 call center or PSAP. In this embodiment, emergency call switch 403 may not be necessary.

Figure 7:
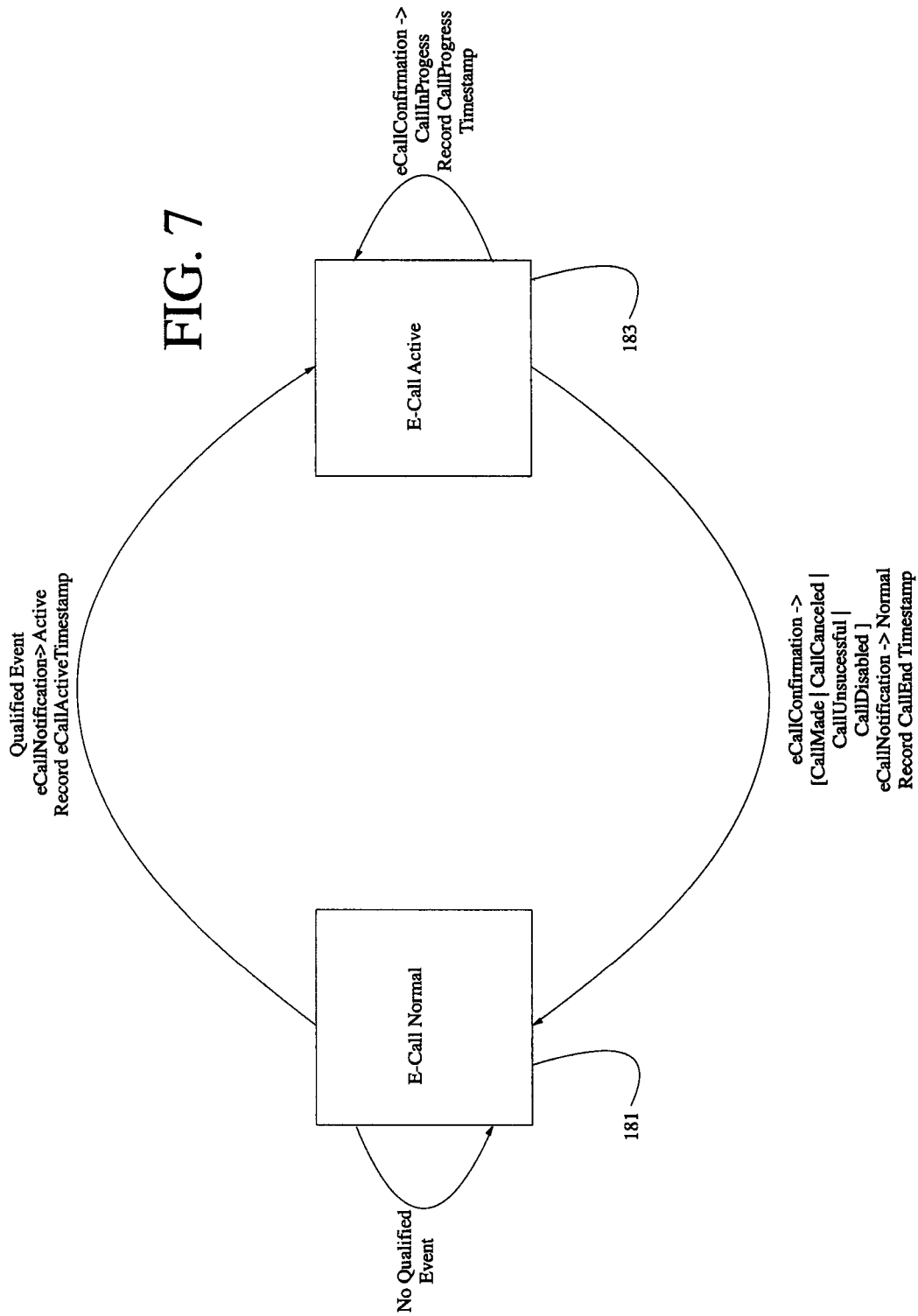
FIG. 7 is an exemplary state diagram of an RCM or equivalent device.

It may also be desirable to have the RCM record call requests for diagnostic purposes. FIG. 7 is an exemplary state diagram of an RCM or equivalent device. In this non-limiting example, the RCM transitions between a "normal" state 181 and a state where an eCall is requested (e.g., an "active" state) 183.

If the RCM is presently in a normal state, it remains there if a qualified event (e.g. airbag deployment) does not occur. Until a triggering event occurs, the RCM will remain in "normal" state.

If a qualified event occurs, the RCM may request an eCall, record a timestamp showing that an eCall was requested, and transition to an "active" state.

As long as a call in progress signal or the like is received by the RCM, it may remain in the active state. Once a confirmation comes that the call was, for example, completed, cancelled, etc., the RCM may record an end of call timestamp and transition back to a "normal" state. Additionally, for example, if messages are not received from the eCall transceiver, the RCM may log error messages so that diagnostics can determine there is a breakdown in communication.

Figure 8:
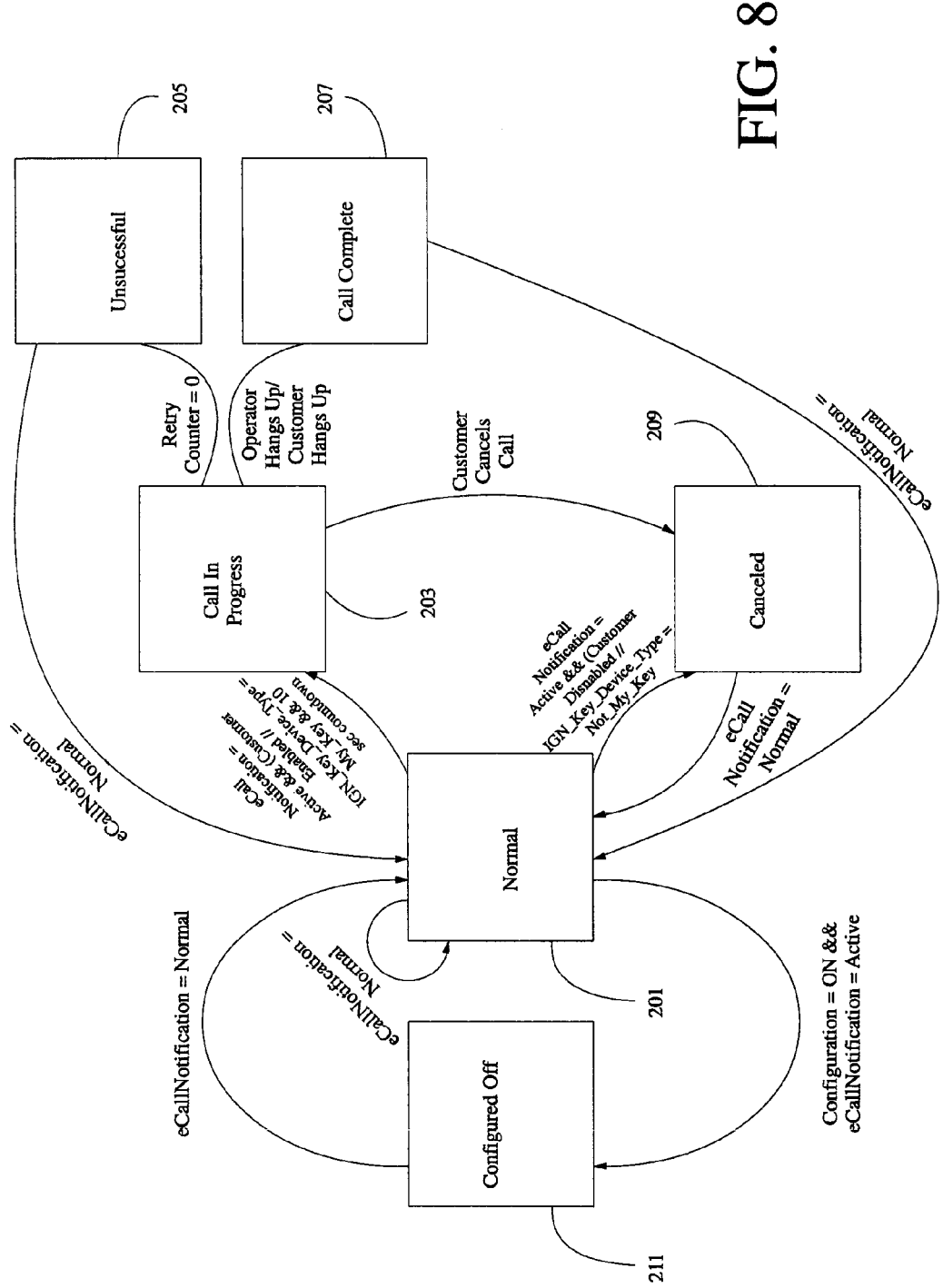
FIG. 8 is an exemplary state diagram of an eCall receiver or equivalent device.

FIG. 8 is an exemplary state diagram of an eCall transceiver or equivalent device. While no call is being placed, the eCall transceiver remains in a "normal" state 201. In this state, it notifies the RCM that it is not placing a call by sending a "normal" signal to the RCM. The receiver will remain in this state until a request from the RCM triggers a state change.

For example, if the RCM requests a call, the receiver may register as "active" and transition to a call in progress through a nomadic device. In addition, it may start a countdown timer before making the call, giving the user an opportunity to cancel the call. Once the timer is up, the receiver may have transitioned into a call in progress state 203.

Or, if eCall is disabled, even if the receiver registers as "active", it will be unable to place a call. In this case, it may transition to a canceled state 209. The canceled state may also be reached from the call in progress state if the caller cancels the call. Once the call is canceled, the receiver may notify the RCM that the call was canceled and return to a normal state.

If the call is in progress, the call may be ended because the nomadic device is unavailable. That is, although the receiver is attempting to place a call, there is no nomadic device that is free for data transfer. In this case, the receiver may transition to an unsuccessful state 205. The receiver may also retry the call for a definable number of times before reaching this state, in an attempt to find a working nomadic device, for example.

The call may also be completed when one party hangs up. If the receiver detects that the user or operator has ended the call, the receiver may transition to a call complete state 207. In both this state and the unsuccessful state, the receiver may notify the RCM that it has returned to a normal state, since the call is no longer being placed in either event.

Finally, in this non-limiting example, if the eCall receiver is turned off from an "on" state, the receiver may transition to an "off" state 211 to, for example, notify the user that eCall has been turned off. Once the notification is made, the receiver can return to its normal state, where it waits for further instructions.

While the illustrative embodiments may be provided in a vehicle where they are automatically activated, it may also be desirable to require some initialization before activating the system.

Figure 9:
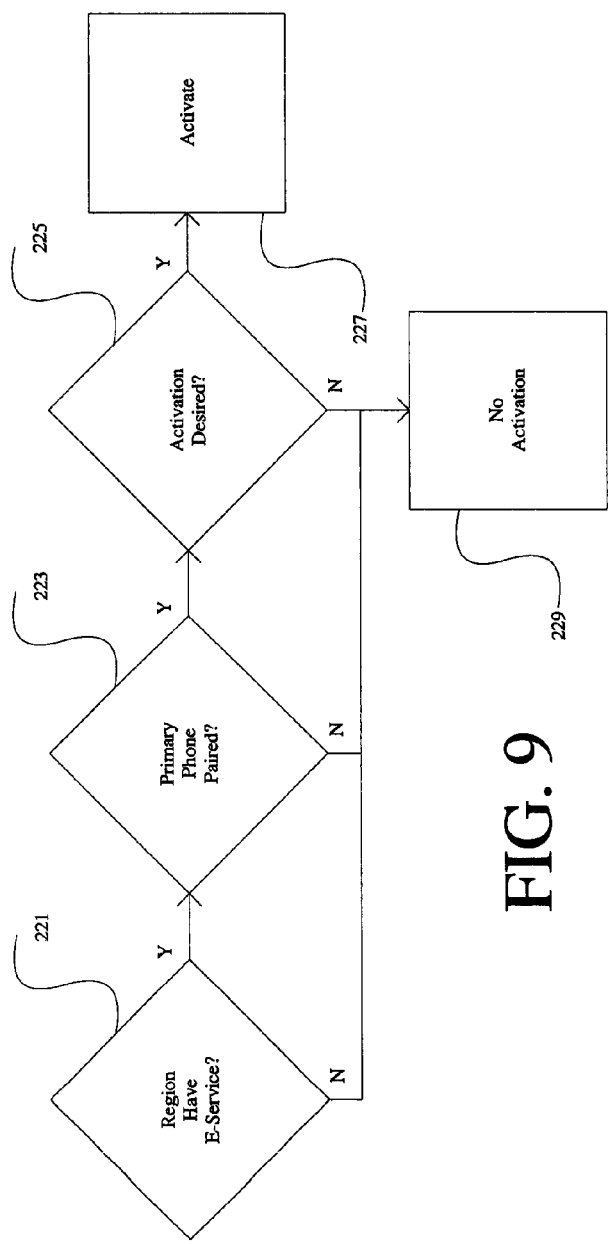
FIG. 9 shows an exemplary routine for activating an eCall system.

FIG. 9 shows an exemplary routine for activating an eCall system. First, there may be a vehicle regional code programmable at manufacture. This may indicate the region of the world in which the vehicle is intended to be deployed. This code may also be changeable by, for example, a dealer or other authorized agent.

The system checks the region code to see if emergency services are available in the deployed region 221. If not, the eCall system cannot be activated 227.

If the services are available, then, in this illustrative embodiment, the system checks to see if a primary phone is present in the vehicle 223. Typically, in a system with primary and secondary phones, the primary phone will belong to the owner of the vehicle. If the primary phone is present, the system proceeds with registration, otherwise it does not 227.

The system then asks the user if eCall activation is desired 225. If so, eCall is activated for the primary and all secondary phones 229, else it is not 227.

While various exemplary, illustrative, non-limiting embodiments have been described in detail, those familiar with the art to which this invention relates will recognize various alternative designs and embodiments for practicing the invention, which is only limited by the following claims.

What is claimed:

1. A vehicle-based computing system comprising:
a processor; and
a transceiver operable to communicate with the processor and to transfer information between the processor and a wireless device, wherein:
the processor is further configured to send instructions to the wireless device, the instructions preventing all other types of incoming and outgoing calls and data transfer from the wireless device based on an instance of an ongoing emergency call, and persisting until the ongoing emergency call ends;
wherein incoming portions of the emergency call are output through vehicle speakers, and outgoing portions of the emergency call are input through a vehicle microphone, the apparatus further including a controller having control over one or more SOS notifications, including an audible notification that is activated at least in the event of a vehicle accident, wherein the controller suppresses the audible notification while the emergency call is in progress.

2. The vehicle-based computing system of claim 1, further including a transfer input, wherein activation of the transfer input causes control of the emergency call to be transferred from a vehicle-based system to the wireless device.

3. The vehicle-based computing system of claim 1, further including a cancellation input, wherein activation of the cancellation input cancels the transfer of the call to the wireless device.

* * * * *